A. E. BUCHANAN.
CLUTCH MECHANISM.
APPLICATION FILED JUNE 13, 1910.

1,003,979.

Patented Sept. 26, 1911.

WITNESSES:
W. J. McMillan
E. P. Hall.

INVENTOR.
Albert E. Buchanan
BY Ridout & Maybee
ATTORNEYS

UNITED STATES PATENT OFFICE.

ALBERT ERNEST BUCHANAN, OF TORONTO, ONTARIO, CANADA, ASSIGNOR TO THE MASSEY-HARRIS COMPANY, LIMITED, OF TORONTO, CANADA.

CLUTCH MECHANISM.

1,003,979.     Specification of Letters Patent.     Patented Sept. 26, 1911.

Application filed June 13, 1910. Serial No. 566,664.

*To all whom it may concern:*

Be it known that I, ALBERT E. BUCHANAN, of the city of Toronto, in the Province of Ontario, Canada, have invented certain new and useful Improvements in Clutch Mechanism, of which the following is a specification.

This invention relates to clutch mechanism especially adapted for use in harvesting machines of the type in which the sheaves as bound are deposited on an endless conveyer which is periodically set in motion to deposit on the ground the sheaves which have been collected. This arrangement necessitates the use of a continuously driven part with which the conveyer is periodically placed in gear through the medium of a clutch and much trouble has been experienced in getting a drive which will operate satisfactorily owing particularly to the difficulty of obtaining a clutch construction which will stand the strain of the sudden throwing on of the load without either slipping or breaking and which will be simple and cheap enough for the requirements of a harvester.

Figure 1:
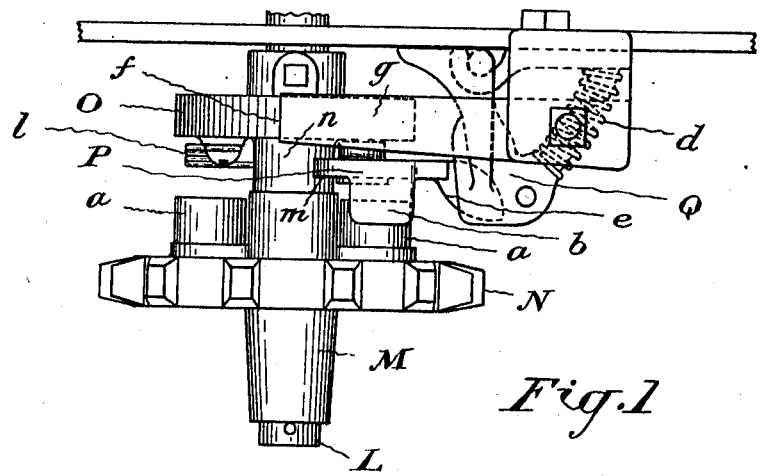
Figure 2:
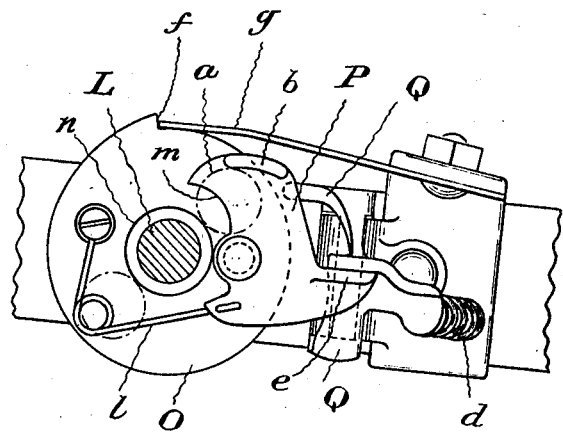
Figure 3:
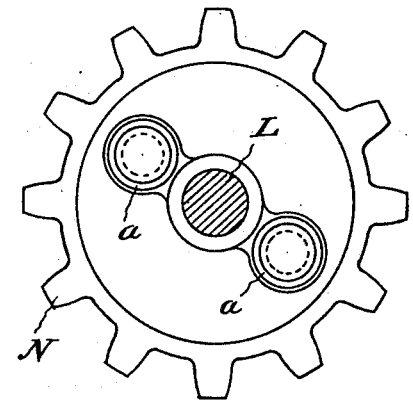

The problem has been solved by constructing a clutch substantially as illustrated in the accompanying drawings, in which:

Figure 1 is a plan view of the clutch. Fig. 2 is a view in cross section looking toward the dog. Fig. 3 is a view in cross section looking toward the sprocket wheel.

In the drawings like letters of reference indicate corresponding parts in the different figures.

L indicates a shaft on which is loosely journaled the sleeve M carrying the sprocket wheel N by which the sleeve may be driven. Projecting from the inner side of the sprocket wheel are the driving studs $a$ preferably formed as rollers. Secured to the shaft L is a disk O on which is pivoted the dog P the end $b$ of which is suitably shaped on the side facing the pivot to engage either one of the studs $a$. This dog is further provided with a toe $m$ which is adapted to engage the hub $n$ of the disk O. A spring $l$ engages the dog P at one end and at the other has an engagement with the disk O. This spring tends to throw the upper end of the dog inwardly into the path of the studs $a$, this movement being limited by the toe $m$ engaging the hub $n$ of the disk O.

Q is a trip pivoted on a suitable stationary part and normally pressed forward by a coil spring $d$ to lie in the path of the tail $e$ formed on the dog P. The contact of the tail $e$ with the trip causes the dog to be rocked to withdraw its end $b$ from the path of the studs $a$.

The disk O is notched to form a ratchet tooth $f$. A spring pawl $g$ is secured to a suitable stationary part and engages the periphery of the disk O. This ratchet tooth $f$ is so located that as soon as the dog P clears itself from the studs $a$, the pawl $g$ engages the ratchet tooth and the disk is locked against backward movement and the dog securely retained out of gear until the trip Q is again withdrawn from engagement with the tail $e$.

In the operation of the device, it will be understood that the sprocket wheel N is normally rotating but out of clutch with the disk O secured to the shaft L, being held out of engagement therewith by the action of the trip Q in holding the end $b$ of the dog P out of engagement with the driving studs $a$. To clutch the parts, the trip Q is withdrawn, manually or otherwise, from contact with the tail $e$ of the dog P which is immediately thrown by the spring $l$ into the path of the studs $a$, thereby clutching the rotating sprocket wheel to the disk O and driving the same until the trip Q is released to again engage the tail $e$ of the dog P and withdraw the dog from clutching engagement with the driving studs of the sprocket wheel. This arrangement has been found to work very satisfactorily and to be very effective when used in operating the sheaf conveyers of harvesting machines as there is no slip as in friction clutches and no teeth to break off as in toothed clutches.

What I claim as my invention is:

1. The combination of a shaft; a disk carried by said shaft; a hub on said disk; a pivoted dog carried by said disk having its end turned in a direction longitudinal of the shaft and having a toe adapted to engage said hub; a spring adapted to throw the dog in to engage the toe with the hub; a sleeve loose on said shaft; a pair of studs on said sleeve adapted to engage the end of said dog on that face of the end directed toward its pivot when the dog is thrown inward by the spring; a tail on the dog; and a releasable trip normally engaged by the tail of the dog to hold said dog out of the path of said studs.

2. The combination of a shaft; a disk carried by said shaft having a ratchet tooth formed thereon; a hub on said disk; a spring pawl engaging said disk; a pivoted dog carried by said disk having its end turned in a direction longitudinal of the shaft and having a toe adapted to engage said hub; a spring adapted to throw the dog in to engage the toe with the hub; a sleeve loose on said shaft; a pair of studs on said sleeve adapted to engage the end of said dog on that face of the end directed toward its pivot when the dog is thrown inward by the spring; a tail on the dog; and a releasable trip normally engaged by the tail of the dog to hold said dog out of the path of said studs.

Signed this sixth day of June, 1910.

ALBERT ERNEST BUCHANAN.

In the presence of—
 LOUIS ANDREW McTAGGART,
 WILLIAM JOHN KERWIN.

---

Copies of this patent may be obtained for five cents each, by addressing the "Commissioner of Patents, Washington, D. C."